United States Patent [19]
Furomoto

[11] Patent Number: 5,381,979
[45] Date of Patent: Jan. 17, 1995

[54] SPINNING REEL WITH HANDLE

[75] Inventor: Yoshiyuki Furomoto, Osaka, Japan

[73] Assignee: Shimano Inc., Osaka, Japan

[21] Appl. No.: 1,615

[22] Filed: Jan. 8, 1993

[30] Foreign Application Priority Data

Jan. 13, 1992 [JP] Japan .................................. 4-003607

[51] Int. Cl.$^6$ ............................................. A01K 89/01
[52] U.S. Cl. ........................................ 242/224; 74/528;
74/545; 74/557; 74/573 R; 242/233; 242/282;
242/907
[58] Field of Search ............... 242/224, 233, 283, 282,
242/284; 74/573 R, 557, 545, 528, 603

[56] References Cited

U.S. PATENT DOCUMENTS

| | | | |
|---|---|---|---|
| 1,386,366 | 8/1921 | Robertson | 74/545 |
| 2,055,358 | 9/1936 | Maynes | 242/283 |
| 2,623,706 | 12/1952 | Von Pein | 242/282 |
| 2,691,309 | 10/1954 | Caroland | 74/545 |
| 3,298,247 | 1/1967 | Guno | 74/573 |
| 3,502,019 | 3/1970 | Koons | 74/573 |
| 3,630,139 | 12/1971 | Wehrle | 74/573 |
| 4,369,930 | 1/1983 | Noda | 242/282 |
| 4,611,503 | 9/1986 | Kocher | 74/603 |

FOREIGN PATENT DOCUMENTS 2256781A 12/1992 United Kingdom .
2257880A 1/1993 United Kingdom .

Primary Examiner—Katherine Matecki
Attorney, Agent, or Firm—Dickstein, Shapiro & Morin

[57] ABSTRACT

A spinning reel comprising a reel body, a handle including an arm projecting to one side with respect to an axis of rotation of the handle, and a grip portion defined in an outer end portion of the arm, a handle shaft connected to the handle to be rotatable on the axis of rotation of the handle, a drive gear housed in the reel body to be rotatable in unison with the handle shaft, and a rotor rotatably supported forwardly of the reel body. The rotor is rotatable by drive transmitted from the handle through said handle shaft and the drive gear. The spinning reel of the invention further comprises balancer means mounted on plural positions axially of the handle for restraining vibration of a rotary mechanism of the handle caused by turning of the handle and for balancing the rotary mechanism of the handle.

4 Claims, 4 Drawing Sheets

SPINNING REEL WITH HANDLE

BACKGROUND OF THE INVENTION

1. Field of the Invention

The present invention relates to spinning reels comprising a handle for rotating a rotor in which the handle includes a single arm projecting radially outwardly of an axis of rotation of the handle and a grip portion provided on an outer end portion of the arm. More particularly, the invention relates to technique of improving the balance of a rotary mechanism of the handle.

2. Description of the Related Art

In conventional spinning reels with a handle having a single arm as noted above, a relatively strong winding operation can be effected in spite of its small and lightweight structure.

In many cases where the handle has the arm projecting to one side of the axis of the rotation of the handle, the handle is rotated by a force applied to the arm when a lure is cast.

Also, some of the conventional reels include a mechanism for moving a bail to a winding position when the rotor is rotated in the winding direction with the bail unlocked. With this structure, the bail may be moved to the winding position with turning of the handle at a time of casting operation. Therefore, the angler sometimes cannot effect the casting operation, It is conceivable that the handle includes an arm portion and a grip portion arranged symmetrically with respect to a handle shaft as in bait casting reels. However, such a construction disadvantageously increases the size of the handle and tends to cause a fishing line to twine around the handle when wind blows the fishing line, which requires improvement.

In addition, since the arm and the grip of the conventional reels are eccentrically arranged with respect to the axis of rotation of the handle, the reel tends to vibrate due to mass eccentricity if the handle is rotated at high speed, which also requires improvement.

SUMMARY OF THE INVENTION

A primary object of the invention is to provide an improved spinning reel free from vibration when a fishing line is taken up to the spool while restraining turning of the handle when a lure is cast without causing any disadvantages of increasing the size of the handle, for example.

In order to fulfill the above-noted object, the present invention is characterized by a handle including a single arm projecting radially outwardly of an axis of rotation of the handle, a grip provided on an outer end portion of the handle, and a plurality of balancers arranged axially of the handle for restraining vibration of a rotary mechanism rotatable with the handle caused by turning of the handle and for balancing the rotary mechanism.

This structure has the following functions and to effects.

With the construction as shown in FIG. 1, the weight is balanced by the balancers B with respect an axis X of the handle. As a result, a rotating force is not exerted on the handle 1 when the reel is swung with a rod at high speed as in a casting operation.

Even turning of the handle at high speed when the fishing line is taken up to the spool does not result in imbalance of the rotary mechanism of the handle or any vibration caused by a couple of force.

According to the present invention, rotation of the rotary mechanism of the handle 1 is not simply balanced, but production of the couple of force due to turning of the handle is restrained at the same time. Thus, the reel of the present invention restrains turning of the handle 1 caused when a casting operation is effected and also vibration of the reel caused when the fishing line is taken up to the spool with the handle 1 having a simple and conventional configuration. Therefore, the present invention provides a spinning reel for restraining turning of the handle when the lure is cast and for smoothly effecting an operation for taking up the fishing line without causing any disadvantage of increasing the size of the handle.

Other objects, advantages and features of the invention will be described in detail hereinafter referring to the accompanying drawings.

DETAILED DESCRIPTION OF THE PREFERRED EMBODIMENTS

Figure 1:
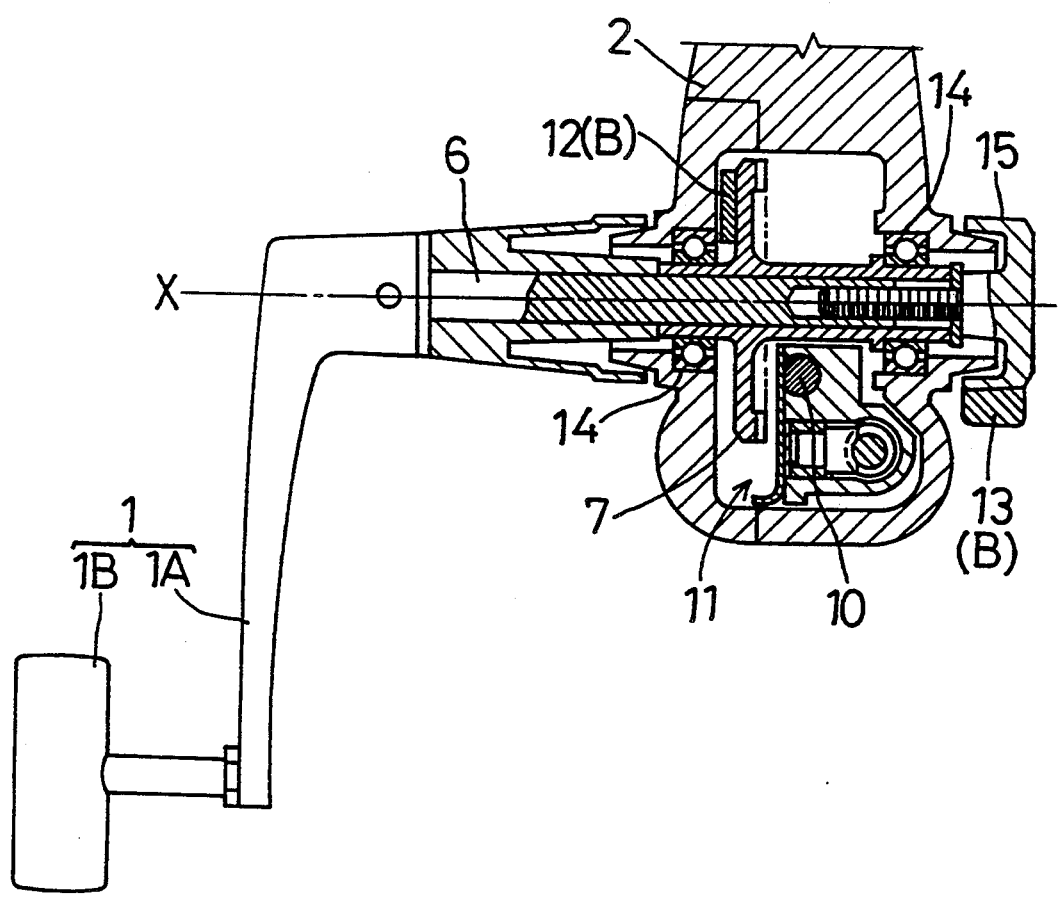
FIG. 1 is a section showing a handle shaft.

A spinning reel according to the present invention will be described hereinafter referring to the drawings.

Figure 4:
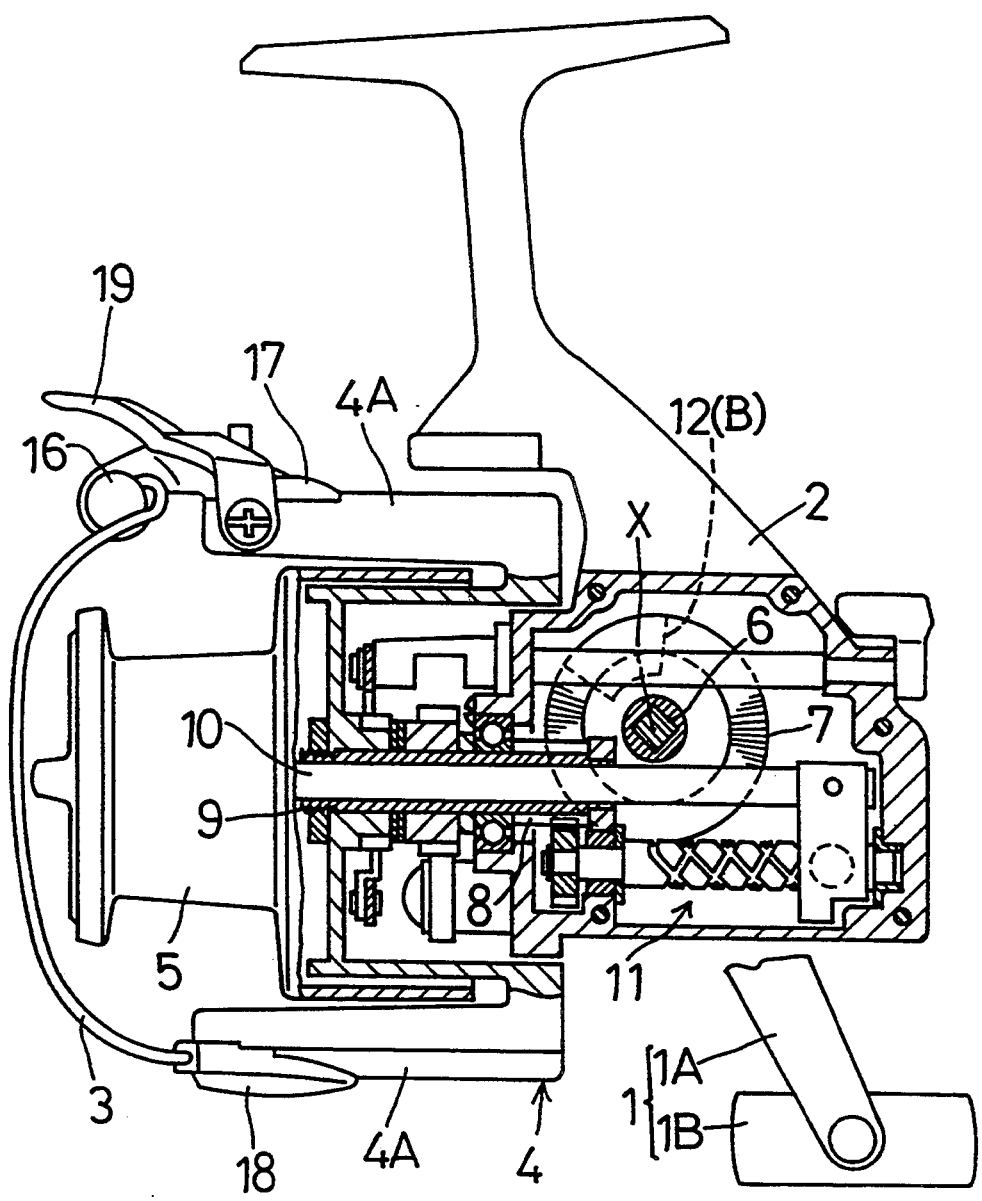
FIG. 4 is a side view of a reel in vertical section.

FIG. 4 shows a spinning reel comprising a reel body 2 with a handle 1, and a rotor 4 having a bail 3 and a spool 5 for taking up a fishing line (not shown), both mounted forwardly of the reel body 2. Drive from a handle shaft 6 connected to the handle 1 is transmitted to the rotor 4 through a drive gear 7, a pinion gear 8 and a sleeve shaft 9 to form a transmission system. An oscillating mechanism 11 is provided for converting drive from the pinion gear 8 to a reciprocating motion for transmission to a spool shaft 10.

Referring to FIG. 1, the handle 1 includes a single arm 1A projecting radially outwardly of an axis X of rotation of the handle and a grip 1B provided on an end portion of the arm 1A. First and second balancers 12 and 13 acting as balancer means B are provided axially of the handle 1 for balancing a rotary mechanism of the handle without causing any couple of force with turning of the handle. The drive gear 7 is supported by the reel body 2 through a pair of bearings 14, and the handle shaft 6 extends through a sleeve portion of the drive gear 7 to be rotatable in unison therewith. To an end portion of the handle shaft a retaining member 15 is screwed.

The first balancer 12 is mounted peripherally of the drive gear 7, while the second balancer 13 is mounted peripherally of the retaining member 15.

The second balancer 13 is provided on the same side as the arm 1A of the handle with respect to the axis X, while the first balancer 12 is provided on the opposite side to the arm 1A and the second balancer 13. These components have properly selected weights. As a result, the rotary mechanism is balanced and little or no couple of force is produced with turning of the handle to restrain vibration caused by turning of the handle.

Figure 2:
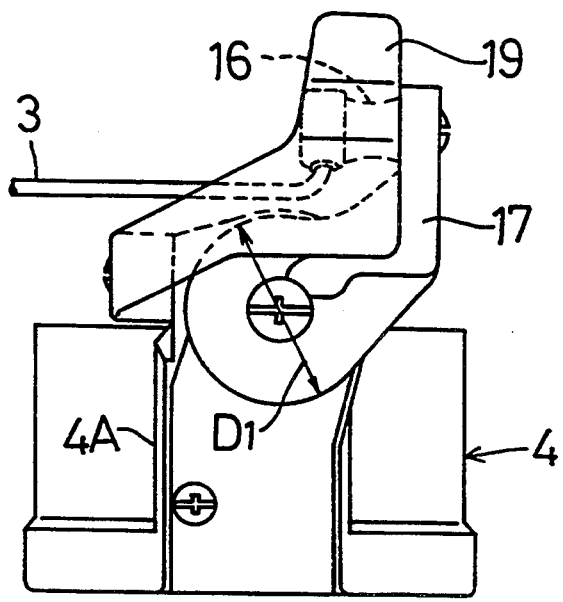
FIG. 2 is a side view showing an arm portion of an arm.
Figure 3:
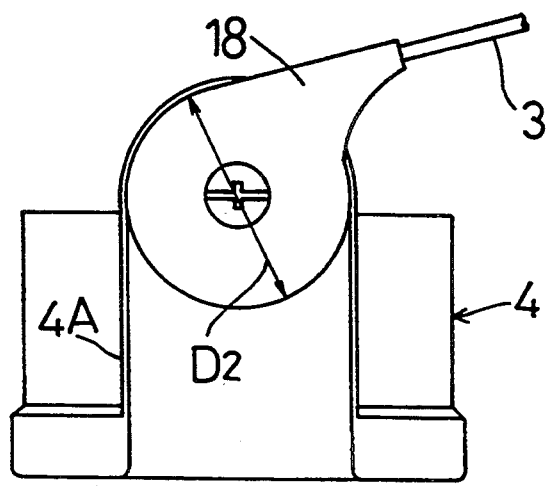
FIG. 3 is a side view showing an arm portion of a support arm.

Referring to FIGS. 2 and 3, the bail 3 is pivotably supported by a pair of arm portions 4A of the rotor 4 through an arm 17 having a line roller 16 and a through a support arm 18. The line roller 16 is a heavy element having a relatively large diameter. In addition, a lever 19 is mounted adjacent the arm 17 for mounting the bail 3 to a line release portion.

In order to eliminate vibration caused with a winding operation of the fishing line due to the heavy element provided in a rotary mechanism of the rotor 4, a proximal portion of the support arm 18 has a diameter D2 larger than a diameter D1 of a proximal portion of the arm 17. Further, corresponding to the respective diameters DE and D1, the arm portion 4A adjacent the support arm 18 has a width larger than a width of the arm portion 4A adjacent the arm 17. Thus, a difference in weight between the arm 17 and the support arm 18 determines a difference in weight between the respective arm portions 4A.

Since the mechanism for operating the handle 1 balances the mechanism of the rotor 4, the handle 1 and the rotor 4 are not rotated even when the reel is swung with a rod at high speed in a casting operation of a lure. When the fishing line is taken up, vibration produced by the handle 1 and rotor 4, respectively, is restrained, which allows the angler to effect a smooth winding operation.

Another embodiment will be described below.

Figure 5:
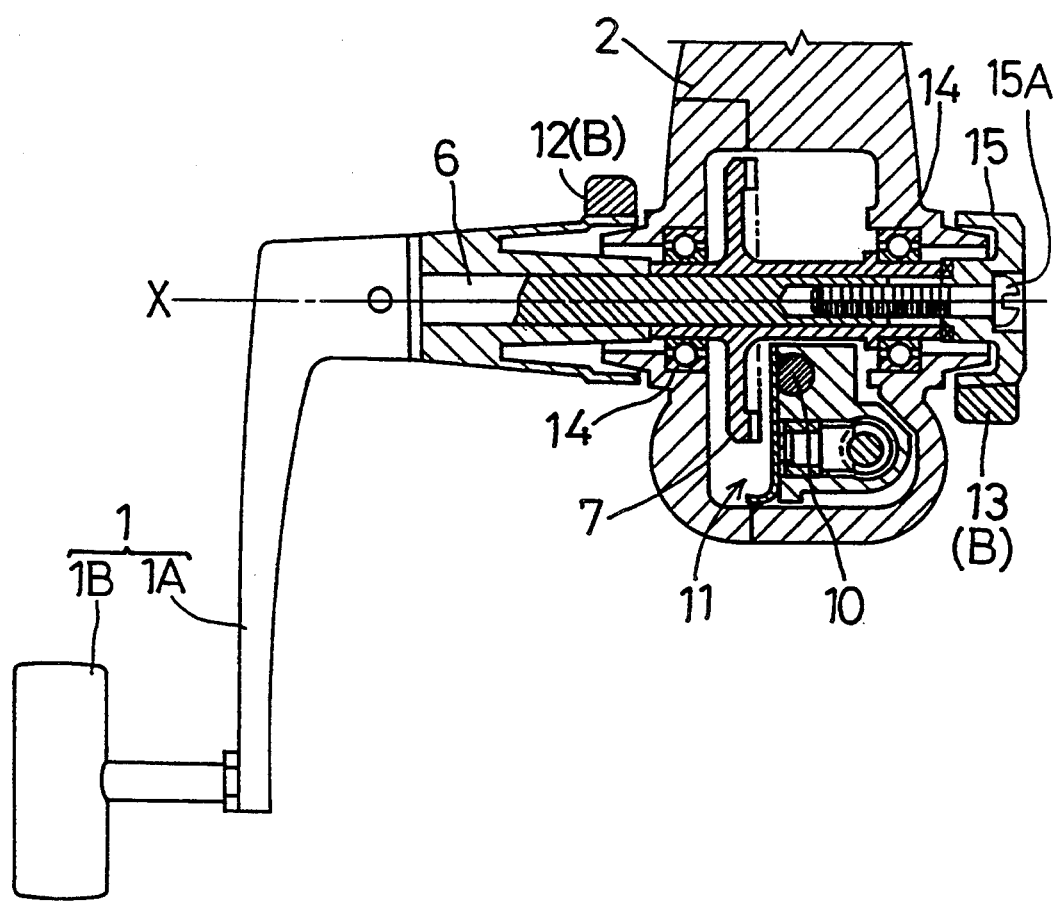
FIG. 5 is a section showing a structure according to another embodiment.

As shown in FIG. 5, the balancer 13 (B) is mounted on the retaining member 15 as described in the first embodiment while the balancer 12 (B) may be mounted in any position on a proximal portion of the handle 1 in proximity to the reel body 2.

According to this embodiment, the retaining member 15 is fitted to the end of the sleeve portion of the drive gear 7 along the axis X to prevent relative rotation therebetween. Also, a bolt 15A is screwed to the handle shaft 6 to fix a relative phase between the balancer 13 and the balancer 12.

More than two balancer means may be provided axially of the handle. Further, the balancer means may be interchangeable, or mounting positions thereof may be adjustable.

What is claimed is:

1. A spinning reel, comprising:
   a reel body;
   a rotor rotatably supported forwardly of said reel body;
   a rotating member rotatably supported on said reel body to rotate said rotor, said rotating member having a rotational axis, and said rotating member including:
   a handle having an arm extending radially on a first side of to said rotational axis,
   a handle shaft connected to said handle, said handle shaft extending along said rotational axis, and
   a drive gear integrally rotatable with said handle shaft, said drive gear transmitting a rotation of said handle to said rotor via said handle shaft;
   a first balancer attached to said rotating member at a position remote from said handle in a direction along said rotational axis, said first balancer being located substantially on said first side of said rotational axis; and
   a second balancer attached to said rotating member at a position between said handle and said first balancer, said second balancer being located substantially at a second side of said rotational axis opposite said first side of said rotational axis.

2. The spinning reel of claim 1, wherein said rotating member includes a retaining member to retain said handle on said reel body, said retaining member is mounted on said handle shaft at an end of said handle shaft opposite said handle, and said first balancer is provided on said retaining member.

3. The spinning reel of claim 1, wherein said second balancer is provided on said drive gear.

4. The spinning reel of claim 1, wherein said handle includes a proximal portion extending substantially co-axially with said rotational axis, and said second balancer is provided on said proximal portion of said handle.

* * * * *